(12) United States Patent
Liang

(10) Patent No.: US 11,798,566 B2
(45) Date of Patent: Oct. 24, 2023

(54) DATA TRANSMISSION METHOD AND APPARATUS, TERMINAL, AND STORAGE MEDIUM

(71) Applicant: Tencent Technology (Shenzhen) Company Limited, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 120 days.

(21) Appl. No.: 17/513,736

(22) Filed: Oct. 28, 2021

(65) Prior Publication Data

US 2022/0059100 A1   Feb. 24, 2022

Related U.S. Application Data

(63) Continuation of application No. PCT/CN2020/120300, filed on Oct. 12, 2020.

(30) Foreign Application Priority Data

Nov. 20, 2019   (CN) .......................... 201911141212.0

(51) Int. Cl.
  *G10L 19/005*   (2013.01)
  *G10L 19/16*   (2013.01)
  (Continued)

(52) U.S. Cl.
  CPC .......... *G10L 19/005* (2013.01); *G10L 19/167* (2013.01); *G10L 25/21* (2013.01); *G10L 25/78* (2013.01); *H04L 1/18* (2013.01)

(58) Field of Classification Search
  CPC ................................ G10L 25/21; G10L 25/78
  See application file for complete search history.

(56) References Cited

U.S. PATENT DOCUMENTS 6,785,261 B1 * 8/2004 Schuster ................. H04L 65/80
  704/200
2005/0228651 A1 * 10/2005 Wang ....................... G10L 19/08
  704/207

(Continued)

FOREIGN PATENT DOCUMENTS

CN    102376306 A    3/2012
CN    103632671 A    3/2014

(Continued)

OTHER PUBLICATIONS

Tencent Technology, WO, PCT/CN2020/120300, Jan. 4, 2021, 4 pgs.

(Continued)

*Primary Examiner* — Douglas Godbold
(74) *Attorney, Agent, or Firm* — Morgan, Lewis & Bockius LLP

(57) ABSTRACT

The present disclosure discloses a data transmission method performed by a computer device and a non-transitory computer-readable storage medium. According to the present disclosure, voice criticality analysis is performed on a to-be-transmitted audio to obtain a criticality level of each to-be-transmitted audio frame in the to-be-transmitted audio, and a corrected redundancy multiple of each to-be-transmitted audio frame is obtained according to a current redundancy multiple and a redundant transmission factor corresponding to the criticality level of each to-be-transmitted audio frame. Therefore, each to-be-transmitted audio frame is duplicated according to a corrected redundancy multiple of each to-be-transmitted audio frame, to obtain at least one redundancy data packet, and the at least one redundancy data packet is transmitted to a target terminal, which can improve the network anti-packet loss effect without causing network congestion.

17 Claims, 5 Drawing Sheets

(51) Int. Cl.
*G10L 25/21* (2013.01)
*G10L 25/78* (2013.01)
*H04L 1/18* (2023.01)

(56) References Cited

U.S. PATENT DOCUMENTS

| | | | |
|---|---|---|---|
| 2010/0312552 A1* | 12/2010 | Zheng | G10L 19/005 704/219 |
| 2013/0185084 A1* | 7/2013 | Rajendran | G10L 19/04 704/500 |
| 2015/0078372 A1* | 3/2015 | Mani | H04M 1/2535 370/352 |
| 2017/0103761 A1* | 4/2017 | Sun | G10L 19/028 |
| 2017/0111856 A1* | 4/2017 | Rajendran | G10L 19/22 |
| 2018/0270288 A1* | 9/2018 | Wang | H04L 65/70 |

FOREIGN PATENT DOCUMENTS

| | | |
|---|---|---|
| CN | 105871514 A | 8/2016 |
| CN | 107181968 A | 9/2017 |
| CN | 108075859 A | 5/2018 |
| CN | 109951254 A | 6/2019 |
| CN | 110890945 A | 3/2020 |

OTHER PUBLICATIONS

Tencent Technology, IPRP, PCT/CN2020/120300, May 17, 2022, 5 pgs.

Tencent Technology, ISR, PCT/CN2020/120300, Jan. 4, 2021, 2 pgs.

\* cited by examiner

DATA TRANSMISSION METHOD AND APPARATUS, TERMINAL, AND STORAGE MEDIUM

CROSS REFERENCE TO RELATED APPLICATIONS

This application is a continuation application of PCT Patent Application No. PCT/CN2020/120300, entitled "DATA TRANSMISSION METHOD AND APPARATUS, TERMINAL, AND STORAGE MEDIUM" filed on Oct. 12, 2020, which claims priority to Chinese Patent Application No. 201911141212.0, filed with the State Intellectual Property Office of the People's Republic of China on Nov. 20, 2019, and entitled "DATA TRANSMISSION METHOD AND APPARATUS, TERMINAL, AND STORAGE MEDIUM", all of which are incorporated herein by reference in their entirety.

FIELD OF THE TECHNOLOGY

The present disclosure relates to the field of network technologies, and in particular, to a data transmission method and apparatus, a terminal, and a storage medium.

BACKGROUND OF THE DISCLOSURE

With the development of network technologies, terminals can communicate with each other by using a Voice over Internet Protocol (VoIP) technology. As Internet is an unreliable transmission network, audio data transmitted over the Internet is prone to packet loss.

Currently, network packet loss may be resisted in a manner such as forward error correction (FEC), packet loss concealment (PLC), or automatic repeat request (ARQ). However, FEC or PLC technology has the poor anti-packet loss effect for a continuous and burst large quantity of packet loss phenomenon, and ARQ technology has the poor anti-packet loss effect in some real-time scenarios. Therefore, a data transmission method is urgently needed to improve the anti-packet loss effect of network in various scenarios.

SUMMARY

Embodiments of the present disclosure provide a data transmission method and apparatus, a terminal, and a storage medium. The technical solutions are as follows.

According to an aspect, a data transmission method is performed by a computer device, the method including:

performing voice criticality analysis on a to-be-transmitted audio to obtain a criticality level of at least one to-be-transmitted audio frame in the to-be-transmitted audio, the criticality level being used for measuring an amount of information carried in the audio frame;

obtaining a quantity of redundant transmissions of the at least one to-be-transmitted audio frame according to a current redundancy multiple and a redundant transmission factor corresponding to the criticality level, the criticality level being positively correlated with a size of the redundant transmission factor, and the current redundancy multiple being determined based on a current packet loss condition of a target terminal; and duplicating the at least one to-be-transmitted audio frame according to the quantity of redundant transmissions to obtain at least one redundancy data packet, and transmitting the at least one redundancy data packet to the target terminal.

According to an aspect, a terminal is provided, including one or more processors and one or more memories, the one or more memories storing at least one computer program, the at least one computer program being loaded and executed by the one or more processors to implement an operation performed in the data transmission method according to any one of the foregoing possible implementations.

According to an aspect, a non-transitory computer-readable storage medium is provided, storing at least one computer program, the at least one computer program being loaded and executed by a processor of a computer device to implement an operation performed in the data transmission method according to any one of the foregoing possible implementations.

BRIEF DESCRIPTION OF THE DRAWINGS

To describe the technical solutions of embodiments of the present disclosure more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following describes the implementations of the present disclosure in further detail with reference to the accompanying drawings.

Terms involved in the embodiments of the present disclosure are described in the following:

VoIP is a voice call mode based on an Internet Protocol (IP) network. In some embodiments, after encoding and compressing audio data by using an audio compression algorithm, a transmission terminal device packages the audio data after the encoding and compressing according to a network transmission protocol standard, to obtain an audio data packet, and transmits the audio data packet to a target IP address corresponding to a receiving terminal device by using an IP network. After parsing and decompressing the audio data packet, the receiving terminal device restores the audio data packet into an original voice signal, so as to transfer a voice signal via Internet.

Because Internet is not a reliable transmission network, and instability of the transmission network causes a packet loss phenomenon (that is, a part or all of audio data packets are lost during transmission) during transmitting audio data, so that the receiving terminal device has freezing and incoherent sound, which reduces user experience of an audio receiver. Therefore, an audio application (such as VoIP, voice broadcast, and audio and video broadcasting) carried on the Internet needs to face an anti-packet loss problem during transmitting audio data. In view of this, an embodiment of the present disclosure provides a data transmission method having the good anti-packet loss effect under various scenarios, and the method is described in the following in detail.

Figure 1:
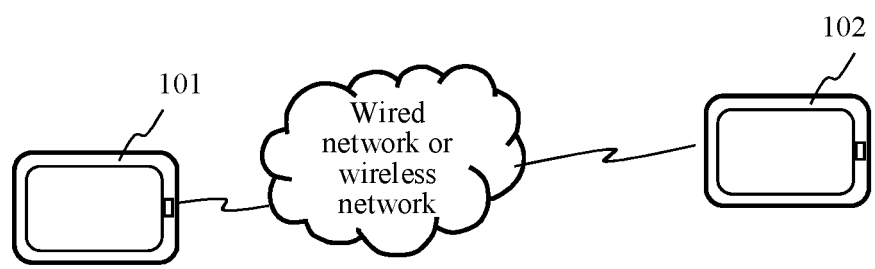
FIG. 1 is a schematic diagram of an implementation environment of a data transmission method according to an embodiment of the present disclosure.

FIG. 1 is a schematic diagram of an implementation environment of a data transmission method according to an embodiment of the present disclosure. Referring to FIG. 1, the implementation environment may include: a transmission terminal device 101 and a receiving terminal device 102.

The transmission terminal device 101 may be a terminal used by a first user, and an application supporting audio data transmission may be installed and run in the transmission terminal device 101. The application may be any one of a call application, a social application, a broadcasting application, a take-away application, or a car-hailing application. The application may provide an audio data transmission service in a VoIP manner, a voice broadcast manner, or an audio and video broadcasting manner.

The receiving terminal device 102 may be a terminal used by a second user, and an application supporting audio data transmission may be installed and run in the receiving terminal device 102. The application may be any one of a call application, a social application, a broadcasting application, a take-away application, or a car-hailing application. The application may provide an audio data transmission service in a VoIP manner, a voice broadcast manner, or an audio and video broadcasting manner.

The transmission terminal device 101 may be connected to the receiving terminal device 102 through a wired or wireless network.

In an exemplary scenario, the first user may trigger a call request of a VoIP call on an application of the transmission terminal device 101, and the transmission terminal device 101 may transmit the call request to the receiving terminal device 102 by using a server. The second user triggers a call response on an application of the receiving terminal device 102, and the call response is used for representing answering a VoIP call or rejecting a VoIP call. The receiving terminal device 102 transmits the call response to the transmission terminal device 101 by using a server, and the transmission terminal device 101 parses the call response when receiving the call response. If the call response representing answering a VoIP call, the transmission terminal device 101 and the receiving terminal device 102 establish a data channel for VoIP calls, and audio data is transmitted in the data channel. The server may be a computer device providing a VoIP call service.

The transmission terminal device 101 and the receiving terminal device 102 respectively refer to a data transmitter and a data receiver in a data transmission process. During data exchange, the transmission terminal device 101 may alternatively be used as a data receiver. Similarly, the receiving terminal device 102 may alternatively be used as a data transmitter. The transmission terminal device 101 and the receiving terminal device 102 transmit audio data to each other during a VoIP call, to implement the real-time voice call interaction.

In some embodiments, the applications installed on the transmission terminal device 101 and the receiving terminal device 102 are the same, or the applications installed on two terminals are the same type of applications of different operating system platforms. The transmission terminal device 101 may generally refer to one of a plurality of terminals, the receiving terminal device 102 may generally refer to one of a plurality of terminals, and in this embodiment, description is made by using only the transmission terminal device 101 and the receiving terminal device 102 as an example. Device types of the transmission terminal device 101 and the receiving terminal device 102 are the same or different. The device type includes at least one of a smartphone, a tablet computer, an ebook reader, a moving picture experts group audio layer III (MP3) player, a moving picture experts group audio layer IV (MP4) player, a laptop computer, and a desktop computer. For example, the transmission terminal device 101 and the receiving terminal device 102 may be a smartphone, or another handheld portable terminal device. The following embodiment is described by using an example in which the terminal includes a smartphone.

A person skilled in the art may learn that there may be more or fewer terminals. For example, in a scenario of a phone conversation of two parties, there may be only two terminals, or there may be dozens of or hundreds of terminals or more in a scenario of a phone conversation of a plurality of parties. The quantity and the device type of the terminals are not limited in the embodiments of the present disclosure.

Figure 2:
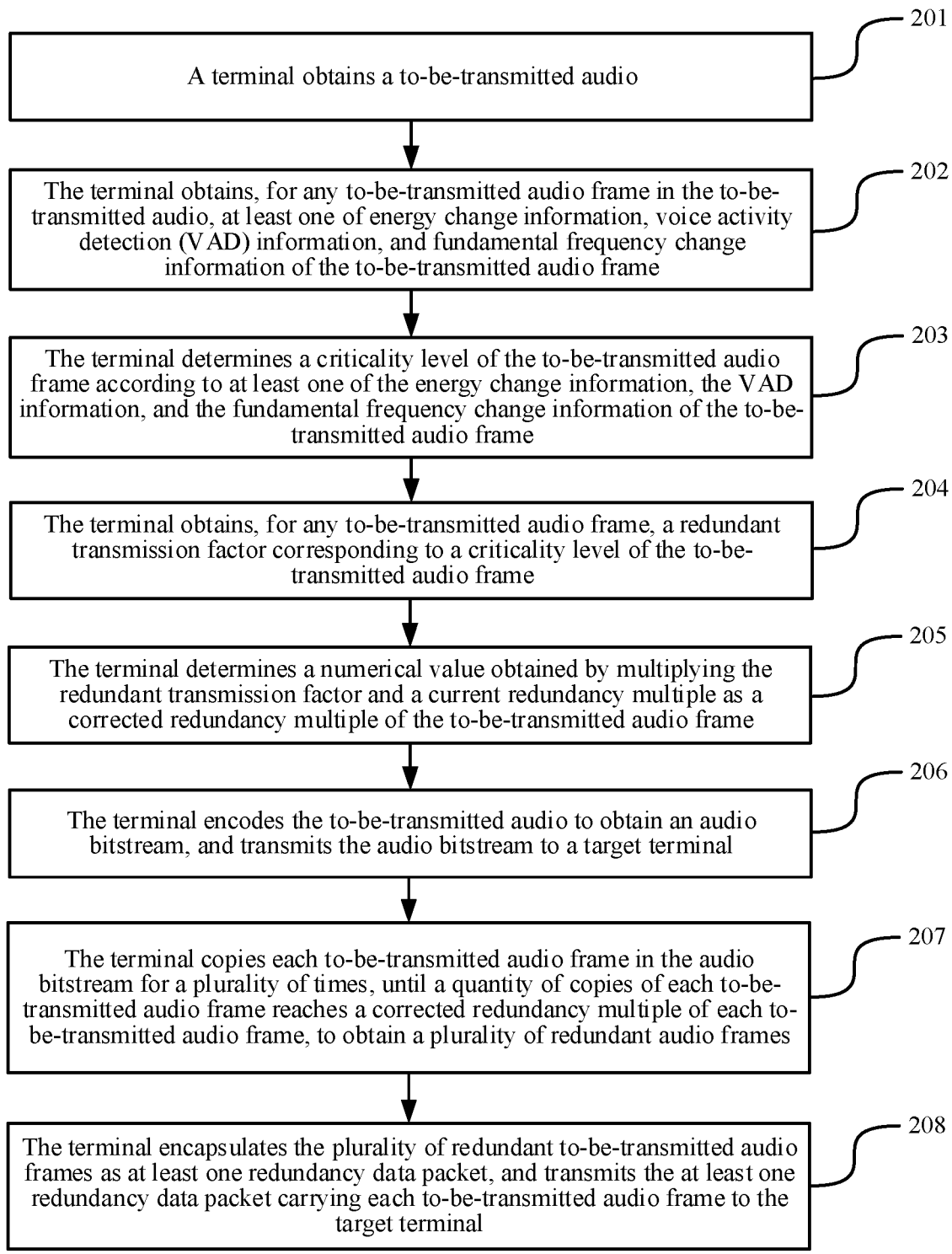
FIG. 2 is a flowchart of a data transmission method according to an embodiment of the present disclosure.

FIG. 2 is a flowchart of a data transmission method according to an embodiment of the present disclosure. Referring to FIG. 2, the embodiment may be applied in an interaction process of the transmission terminal device 101 and the receiving terminal device 102 in the foregoing implementation environment. An example in which the transmission terminal device 101 is a terminal, and the receiving terminal device 102 is a target terminal is used for description, and the embodiment includes the following steps:

201: A terminal obtains a to-be-transmitted audio.

In the foregoing process, the terminal may call a recording interface to record a piece of to-be-transmitted audio. Alternatively, the terminal may select a piece of audio from a locally stored audio as a to-be-transmitted audio. A method for obtaining a to-be-transmitted audio is not specifically limited in this embodiment of the present disclosure.

In an exemplary scenario, a user may log in to an application providing an audio service on the terminal. When a trigger operation of the user on a VoIP call option of the application is detected, the terminal initiates a VoIP call request to a target terminal. When the target terminal returns a VoIP call answering response to the terminal, the terminal calls a recording interface of the application for recording, to obtain the to-be-transmitted audio.

202: The terminal obtains, for any to-be-transmitted audio frame in the to-be-transmitted audio, at least one of energy change information, voice activity detection (VAD) information, and fundamental frequency change information of the to-be-transmitted audio frame.

In the foregoing process, the to-be-transmitted audio may include at least one to-be-transmitted audio frame obtained through natural framing. In some embodiments, the terminal may alternatively perform reframing on the to-be-transmitted audio to obtain at least one to-be-transmitted audio frame, and the at least one to-be-transmitted audio frame may have correlation in a time domain or a frequency domain.

In some embodiments, when performing framing processing on the to-be-transmitted audio, the terminal may perform pre-emphasis processing on the to-be-transmitted audio first, to enhance a high frequency component of the to-be-transmitted audio, and then segment the to-be-transmitted audio after the pre-emphasis into at least one to-be-transmitted audio frame of equal time length by using a window function, to obtain at least one to-be-transmitted audio frame of the to-be-transmitted audio. To-be-transmitted audio frames may overlap each other to a certain extent, so as to ensure that edge features of the to-be-transmitted audio frames are not lost. In some embodiments, the window function may be at least one of a Hemming window, a Hanning window, and a rectangular window. A type of a window function adopted for framing is not specifically limited in this embodiment of the present disclosure.

In the foregoing process, energy change information of any to-be-transmitted audio frame may be short-term energy change information between the to-be-transmitted audio frame and a previous to-be-transmitted audio frame of the to-be-transmitted audio frame, alternatively, may be short-term average amplitude change information between the to-be-transmitted audio frame and a previous to-be-transmitted audio frame of the to-be-transmitted audio frame. VAD information of any to-be-transmitted audio frame may be VAD value change information between the to-be-transmitted audio frame and a previous to-be-transmitted audio frame of the to-be-transmitted audio frame. Fundamental frequency change information of any to-be-transmitted audio frame may be fundamental frequency value change information between the to-be-transmitted audio frame and a previous to-be-transmitted audio frame of the to-be-transmitted audio frame.

In some embodiments, the terminal may perform short-term energy detection on the at least one to-be-transmitted audio frame, to obtain an energy value of each to-be-transmitted audio frame; perform VAD detection based on features such as audio short-term stability on the at least one to-be-transmitted audio frame, to obtain a VAD value of each to-be-transmitted audio frame; and perform fundamental frequency detection on the at least one to-be-transmitted audio frame, to obtain a fundamental frequency value of each to-be-transmitted audio frame. A fundamental frequency value is a pitch and is an important feature of an audio. Different morphemes have different fundamental frequency values, and fundamental frequency values are constantly changing in a piece of normal voice. Therefore, if a fundamental frequency value changes very little in a certain period, it may be considered that all to-be-transmitted audio frames in this period are noise frames.

203: The terminal determines a criticality level of the to-be-transmitted audio frame according to at least one of the energy change information, the VAD information, and the fundamental frequency change information of the to-be-transmitted audio frame.

The criticality level is used for measuring an amount of information carried in the to-be-transmitted audio frame, and the amount of information carried in the to-be-transmitted audio frame is usually related to a possibility in which the to-be-transmitted audio frame is a noise frame. That is, a larger amount of information carried in a to-be-transmitted audio frame indicates a smaller possibility in which the to-be-transmitted audio frame is a noise frame, and a smaller amount of information carried in the to-be-transmitted audio frame indicates a higher possibility in which the to-be-transmitted audio frame is a noise frame. In some embodiments, the criticality level may include at least one level, and a level with a lower criticality indicates that a to-be-transmitted audio frame at this level carries less amount of information.

In some embodiments, for any to-be-transmitted audio frame, the terminal may determine a criticality level of the to-be-transmitted audio frame by using any one of the following two manners:

Manner 1: The terminal determines whether the to-be-transmitted audio frame meets a determining criterion of each level separately, and obtains, when the to-be-transmitted audio frame meets a determining criterion of at least one level, the criticality level of the to-be-transmitted audio frame as a level with a highest criticality in the at least one level, the determining criterion of each level being related to at least one of the energy change information, the VAD information, and the fundamental frequency change information of the to-be-transmitted audio frame.

That is, the terminal may determine whether the to-be-transmitted audio frame meet a determining criterion of each level one by one, and obtains, when the to-be-transmitted audio frame only meets a determining criterion of a single level, the criticality level of the to-be-transmitted audio frame as the level, and the terminal may obtain, when the to-be-transmitted audio frame meets determining criterions of a plurality of levels, a level with a highest criticality in the plurality of levels as the criticality level of the to-be-transmitted audio frame. In the foregoing process, the terminal determines whether the to-be-transmitted audio frame meets the determining criterions of all the levels one by one, and selects a level with a highest criticality as the criticality level of the to-be-transmitted audio frame. Therefore, accuracy of the criticality level to which the to-be-transmitted audio frame belongs can be ensured when the determining criterions of all the levels are overlapped with each other.

Manner 2: The terminal determines whether the to-be-transmitted audio frame meets a determining criterion of each level in descending order of criticalities, the determining criterion of each level being related to at least one of the energy change information, the VAD information, and the fundamental frequency change information of the to-be-transmitted audio frame; obtains, when the to-be-transmitted audio frame meets a determining criterion of a current level, the criticality level of the to-be-transmitted audio frame as the current level; and performs, when the to-be-transmitted audio frame does not meet a determining criterion of the current level, an operation of determining whether the to-be-transmitted audio frame meets a determining criterion of a next level.

That is, the terminal determines whether the to-be-transmitted audio frame meets a determining criterion of each level separately in descending order of criticalities. Starting from a level with a highest criticality, if the to-be-transmitted audio frame meets a determining criterion of the level with a highest criticality, a criticality level of the to-be-transmitted audio frame is obtained as the level with a highest criticality, and subsequent determining operations of levels are not required to be performed. If the to-be-transmitted audio frame does not meet the determining criterion of the level with a highest criticality, whether the to-be-transmitted audio frame meets a determining criterion of a second level with a highest criticality continues to be determined. By analogy, this is not described herein again. In the foregoing process, it is not necessary to determine whether the to-be-transmitted audio frame meets a determining criterion of each level. After a criticality level of a to-be-transmitted audio frame is determined, there is no need to further determine whether the to-be-transmitted audio frame meets a determining criterion of a next level with a lower criticality, thereby optimizing a judgment logic for a criticality level on the terminal, and improving processing efficiency in which the terminal determines a criticality level of each to-be-transmitted audio frame.

In some embodiments, the criticality level may include a first level, a second level, a third level, and a fourth level, and determining criterions of the four levels are described in detail in the following:

In some embodiments, the determining criterion of the first level includes the following: a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is greater than a target threshold.

The target threshold may be any numerical value greater than or equal to 0, and a value of the target threshold is not specifically limited in this embodiment of the present disclosure.

The VAD value of the to-be-transmitted audio frame is 1 and the VAD value of the previous to-be-transmitted audio frame is 0, so that it indicates that the VAD value of the to-be-transmitted audio frame is changed, and the to-be-transmitted audio frame is probably an initial frame transiting from a noise frame (or a silence frame) to a non-noise frame (or a non-silence frame) in a to-be-transmitted audio. Further, the absolute value of the difference between the fundamental frequency values of the to-be-transmitted audio frame and the previous to-be-transmitted audio frame is relatively large, so that it indicates that the to-be-transmitted audio frame is probably a to-be-transmitted audio frame whose voice tone has changed in the to-be-transmitted audio. Therefore, when one to-be-transmitted audio frame meets the foregoing several conditions, it indicates that the to-be-transmitted audio frame is not only an initial frame transiting from a noise frame (or a silence frame) to a non-noise frame (or a non-silence frame), but also a to-be-transmitted audio frame whose voice tone has changed. Therefore, it may be determined that a criticality level of the to-be-transmitted audio frame is the first level, that is, a level with a highest criticality, and the to-be-transmitted audio frame carries a largest amount of information.

In some embodiments, the determining criterion of the second level includes the following: a VAD value of the to-be-transmitted audio frame is 1, a VAD value of a previous to-be-transmitted audio frame of the to-be-transmitted audio frame is 1, and an energy value of the to-be-transmitted audio frame is greater than a target multiple of an energy value of the previous to-be-transmitted audio frame; or a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is greater than the target threshold.

The target multiple may be any numerical value greater than or equal to 1, and a value of the target multiple is not specifically limited in this embodiment of the present disclosure.

On the one hand, the VAD value of the to-be-transmitted audio frame is 1, and the VAD value of the previous to-be-transmitted audio frame is 1 and the energy value of the to-be-transmitted audio frame is greater than the target multiple of the energy value of the previous to-be-transmitted audio frame, so that it indicates that the to-be-transmitted audio frame is probably is a to-be-transmitted audio frame transiting from an unvoiced sound to a voiced sound in the to-be-transmitted audio. However, on the other hand, the VAD value of the to-be-transmitted audio frame is 1, and the VAD value of the previous to-be-transmitted audio frame is 0 and the absolute value of the difference between the fundamental frequency values of the to-be-transmitted audio frame and the previous to-be-transmitted audio frame is less than or equal to the target threshold, so that it indicates that the to-be-transmitted audio frame is still probably an initial frame transiting from a noise frame (or a silence frame) to a non-noise frame (or a non-silence frame) although the voice tone of the to-be-transmitted audio frame is not probably changed. Therefore, when one to-be-transmitted audio frame meets any one of the foregoing determining criterions, a criticality level of the to-be-transmitted audio frame is determined as the second level.

In some embodiments, the determining criterion of the third level includes that a VAD value of the to-be-transmitted audio frame is 1.

In the foregoing process, the VAD value of the to-be-transmitted audio frame is 1, and it indicates that the to-be-transmitted audio frame is probably a non-noise frame (or a non-silence frame). Therefore, when a VAD value of one to-be-transmitted audio frame is 1 and the to-be-transmitted audio frame does not meet the determining criterions of the first level and the second level, a criticality level of the to-be-transmitted audio frame is determined as the third level.

In some embodiments, the determining criterion of the fourth level includes that a VAD value of the to-be-transmitted audio frame is 0.

In the foregoing process, the VAD value of the to-be-transmitted audio frame is 0, and it indicates that the to-be-transmitted audio frame is probably a noise frame (or a silence frame). Therefore, when a VAD value of one to-be-transmitted audio frame is 0, a criticality level of the to-be-transmitted audio frame is determined as the fourth level.

Through division of the foregoing four criticality levels, a criticality level corresponding to each to-be-transmitted audio frame may be determined according to the foregoing manner 1 or manner 2 separately. Certainly, in some embodiments, the criticality of the to-be-transmitted audio frame may alternatively be divided into more or fewer levels, and other determining criterions may further be determined for each criticality level. A quantity of criticality levels and a determining criterion of each criticality level are not specifically limited in this embodiment of the present disclosure.

The foregoing step 202 and step 203 describe how to determine, by using any to-be-transmitted audio frame as an example, a criticality level of the to-be-transmitted audio frame. The terminal may implement a voice criticality analysis on the to-be-transmitted audio frame by repeating the foregoing step 202 and step 203 on a to-be-transmitted audio, to obtain a criticality level of at least one to-be-transmitted audio frame in the to-be-transmitted audio. The division of the criticality level is performed on the to-be-transmitted audio frames separately, so that different corrected redundancy multiples (that is, a quantity of redundant transmissions) may be allocated to the to-be-transmitted audio frames according to different criticality levels to which the to-be-transmitted audio frames belong in subsequent steps, so as to set a relatively large corrected redundancy multiple for a to-be-transmitted audio frame with a higher criticality level, and set a relatively small corrected redundancy multiple for a to-be-transmitted audio frame with a lower criticality level. Compared with a condition of setting the same current redundancy multiple for all the to-be-transmitted audio frames, it can avoid occupying relatively much system bandwidth resources and avoid network congestion caused by a redundancy multiple mechanism, thus improving the anti-packet loss effect of audio data transmission while avoiding network congestion.

204: The terminal obtains, for any to-be-transmitted audio frame, a redundant transmission factor corresponding to a criticality level of the to-be-transmitted audio frame.

For to-be-transmitted audio frames with different criticality level, different criticality levels correspond to different redundant transmission factors. The criticality level being positively correlated with a size of the redundant transmission factor. That is, a higher criticality level indicates a larger redundant transmission factor, and a lower criticality level indicates a smaller redundant transmission factor. The redundant transmission factor may be any numerical value greater than 0 and less than or equal to 1.

For example, the division of the four criticality levels are used as an example for description. A redundant transmission factor a of each level may be configured as follows: a redundant transmission factor a of the first level is 1, a redundant transmission factor a of the second level is 0.7, a redundant transmission factor a of the third level is 0.4, and a redundant transmission factor of the fourth level is 0.2.

In the foregoing process, the terminal may map, for any to-be-transmitted audio frame, a criticality level of the to-be-transmitted audio frame to a corresponding redundant transmission factor according to a mapping relationship between the criticality level and the redundant transmission factor. In some embodiments, the mapping relationship may be prestored locally by the terminal, or may be downloaded from the server each time the terminal needs to transmit audio data, or may be downloaded by the terminal from the server regularly. In some embodiments, the server may further update the mapping relationship regularly, and delivers an updated mapping relationship to each terminal after updating the mapping relationship, so that each terminal replaces the existing mapping relationship with the updated mapping relationship.

205: The terminal determines a numerical value obtained by multiplying the redundant transmission factor and a current redundancy multiple as a corrected redundancy multiple of the to-be-transmitted audio frame.

The current redundancy multiple is determined based on a current packet loss condition of a target terminal, and a corrected redundancy multiple of each to-be-transmitted audio frame is used for representing a quantity of redundant transmissions of each to-be-transmitted audio frame.

In the foregoing step 205, that is, the terminal determines the numerical value obtained by multiplying the redundant transmission factor and the current redundancy multiple as a quantity of redundant transmissions of the to-be-transmitted audio frame.

It is assumed that a ($0<a\leq1$) is used for representing a redundant transmission factor, r0 is used for representing a current redundancy multiple of the target terminal, and a corrected redundancy multiple r of any to-be-transmitted audio frame may be represented as: $r=a*r0$.

In the foregoing process, the terminal may obtain a current packet loss condition of the target terminal from the target terminal. The terminal determines the current redundancy multiple according to the current packet loss condition of the target terminal, and for the same target terminal, the current redundancy multiple is not static. That is, the current redundancy multiple of the target terminal changes along with a change of the current packet loss condition of the target terminal at different time periods. In some embodiments, When the current packet loss condition is relatively serious (for example, a packet loss rate is relatively high), a numerical value of the current redundancy multiple is larger, and when the current packet loss condition is relatively good (for example, a packet loss ratio is relatively low), a numerical value of the current redundancy multiple is smaller. In some embodiments, the current packet loss condition may include at least one of a quantity of packet loss, a packet loss rate, a network latency, and a network fluctuation. Content of the current packet loss condition is not specifically limited in this embodiment of the present disclosure.

In some embodiments, alternatively, the target terminal may determine a current redundancy multiple of the target terminal automatically after collecting statistics on the current packet loss condition, and then transmit the current redundancy multiple to the terminal. Whether the current redundancy multiple is determined by the terminal or the target terminal is not specifically limited in this embodiment of the present disclosure.

The terminal repeats the foregoing step 204 and step 205 on each to-be-transmitted audio frame, to obtain a redundant transmission factor of each to-be-transmitted audio frame, and obtain a corrected redundancy multiple (that is, a quantity of redundant transmissions) of each to-be-transmitted audio frame by multiplying the redundant transmission factor of each to-be-transmitted audio frame and a current redundancy multiple. That is, the terminal obtains the corrected redundancy multiple of each to-be-transmitted audio frame according to the current redundancy multiple and a redundant transmission factor corresponding to a criticality level of each to-be-transmitted audio frame, that is, obtains a quantity of redundant transmissions of at least one to-be-transmitted audio frame. Different to-be-transmitted audio frames may have the same or different corrected redundancy multiples. Generally, a to-be-transmitted audio frame with a higher criticality level indicates a larger value of a redundant transmission factor, so that a corrected redundancy multiple is larger, and a to-be-transmitted audio frame with a lower criticality level indicates a smaller value of a redundant transmission factor, so that a corrected redundancy multiple is smaller.

206: The terminal encodes the to-be-transmitted audio to obtain an audio bitstream, and transmits the audio bitstream to a target terminal.

In the foregoing process, the terminal may encode the to-be-transmitted audio by using any encoding manner to obtain the audio bitstream, encapsulate the audio bitstream as at least one audio data packet, add the at least one audio data packet to a transmission queue of a network session, and transmit at least one audio data packet in the transmission queue and carrying the audio bitstream to the target terminal.

In some embodiments, the encoding manner adopted by the terminal may include any one of the following: waveform encoding, parameter encoding, hybrid encoding, or forward error correction (FEC) encoding. An encoding manner of a to-be-transmitted audio is not specifically limited in this embodiment of the present disclosure.

In some embodiments, the audio bitstream obtained by the terminal through encoding may alternatively be in any format, for example, a pulse code modulation (PCM) format, an MP3 format, and an Ogg Vorbis format (an audio compression format). A format of the audio bitstream is also not specifically limited in this embodiment of the present disclosure.

In some embodiments, the terminal and the target terminal may pre-agree on one or more formats adopted by an audio bitstream transmitted between each other, so that the terminal encodes a to-be-transmitted audio into an audio bitstream of pre-agreed one or more formats, for example, the one or more formats may be an audio compression format supported by both the terminal and the target terminal.

The step 206 may be performed before or after any one of the step 202 to step 205, that is, an execution sequence of the step 206 and any one of the step 202 to step 205 is not specifically limited in the embodiment of the present disclosure.

207: The terminal duplicates each to-be-transmitted audio frame in the audio bitstream for a plurality of times, until a quantity of copies of each to-be-transmitted audio frame reaches a corrected redundancy multiple of each to-be-transmitted audio frame, to obtain a plurality of redundant audio frames.

In the step 207, that is, the terminal duplicates each of at least one to-be-transmitted audio frame in the audio bitstream for a plurality of times, until a quantity of copies reaches a quantity of redundant transmissions of each of the at least one to-be-transmitted audio frame separately, to obtain a plurality of redundant audio frames.

In the foregoing process, it is assumed that a corrected redundancy multiple of a to-be-transmitted audio frame is represented by r, and the terminal duplicates the to-be-transmitted audio frame in the audio bitstream for r times, to obtain r redundant audio frames. By analogy, each to-be-transmitted audio frame is duplicated for r times to obtain r redundant audio frames. A set of redundant audio frames of each to-be-transmitted audio frame may be referred to as the foregoing plurality of redundant audio frames.

In the foregoing process, to-be-transmitted audio frames with different criticality levels have different corrected redundancy multiples, so that to-be-transmitted audio frames with different criticality levels also correspond to different quantities of times of copies. That is, to-be-transmitted audio frames with different criticality levels have different quantity of redundant audio frames respectively. Therefore, for some noise frames (or silence frames) with lower criticality levels, a smaller corrected redundancy multiple indicates a smaller quantity of times of copies, a smaller quantity of redundant audio frames, and less occupied system bandwidth resource, that is because network packet loss occurs in the noise frame (or the silence frame), it does not have a great negative impact on the transmission effect of audio data. Therefore, there is no need to allocate relatively much system bandwidth resource to ensure transmission reliability of the to-be-transmitted audio frames. However, for some non-noise frames (or non-silence frames) with higher criticality levels, a larger corrected redundancy multiple indicates a larger quantity of times of copies, a larger quantity of redundant audio frames, and more occupied system bandwidth resource, that is because when network packet loss occurs in the to-be-transmitted audio frames, it has a great negative impact on the transmission effect of audio data. Therefore, in a case of limited system bandwidth resource, relatively much system bandwidth resource may be allocated to ensure transmission reliability of the to-be-transmitted audio frames, thereby ensuring reasonability of system bandwidth resource configuration, and avoiding network congestion caused by a redundant transmission mechanism.

208: The terminal encapsulates the plurality of redundant to-be-transmitted audio frames as at least one redundancy data packet, and transmits the at least one redundancy data packet carrying each to-be-transmitted audio frame to the target terminal.

In the foregoing process, after the terminal establishes a network session with the target terminal, the terminal may add the at least one redundancy data packet to a transmission queue of the network session. In some embodiments, redundancy data packets may be ranked according to a certain rule in the transmission queue.

In some embodiments, the rule of ranking may include: obtaining accumulated weights of criticality levels of all redundant audio frames carried in the redundancy data packets, and ranking the redundancy data packets in descending order of the accumulated weights. A higher criticality level indicates a higher weight. An accumulated weight of a redundancy data packet is a sum of weights of criticality levels of all redundant audio frames in the redundancy data packet.

In the foregoing step 206 to step 208, the terminal duplicates each to-be-transmitted audio frame according to a corrected redundancy multiple of each to-be-transmitted audio frame, to obtain at least one redundancy data packet, and transmits the at least one redundancy data packet of each to-be-transmitted audio frame to the target terminal. That is, the terminal duplicates the at least one to-be-transmitted audio frame according to a quantity of redundant transmissions to obtain at least one redundancy data packet, and transmits the at least one redundancy data packet to the target terminal. Therefore, not only an audio bitstream is transmitted to the target terminal, but also each redundancy data packet is transmitted to the target terminal. Such a redundant transmission mechanism can better resist a packet loss risk in an Internet transmission process, thereby improving an anti-packet loss phenomenon under various scenarios.

In some embodiments, when both at least one audio data packet carrying an audio bitstream and at least one redundancy data packet carrying a plurality of redundant audio frames are added to a cache region of the transmission queue, a transmission sequence of the at least one audio data packet may be placed before the at least one redundancy data packet, so as to transmit at least one audio data packet to the target terminal first. If a current packet loss condition occurs, the target terminal may obtain a redundant audio frame corresponding to a to-be-transmitted audio frame lost during transmission according to at least one redundancy data packet received subsequently, so as to improve an anti-packet loss phenomenon of the target terminal. In this way, the anti-packet loss phenomenon in data transmission can be greatly improved without causing network congestion, no matter in a scenario of massive packet loss or in a scenario of high real-time performance.

Any combination of the foregoing optional technical solutions may be used to form an optional embodiment of the present disclosure. Details are not described herein.

According to the method provided in the embodiments of the present disclosure, voice criticality analysis is performed on a to-be-transmitted audio to obtain a criticality level of each to-be-transmitted audio frame in the to-be-transmitted audio, and a corrected redundancy multiple of each to-be-transmitted audio frame is obtained according to a current redundancy multiple and a redundant transmission factor corresponding to the criticality level of each to-be-transmitted audio frame. The current redundancy multiple is determined based on a current packet loss condition of a target terminal, and the corrected redundancy multiple of each to-be-transmitted audio frame is used for representing a quantity of redundant transmissions of each to-be-transmitted audio frame. Because the criticality level is used for measuring an amount of information carried in the audio frame, different criticality levels correspond to different redundant transmission factors, and the criticality level is positively correlated to a size of the redundant transmission factor. That is, a to-be-transmitted audio frame with a higher criticality level corresponds to a redundant transmission factor with a larger numerical value, so that a corrected redundancy multiple with a larger numerical value may be obtained. Each to-be-transmitted audio frame is duplicated according to a corrected redundancy multiple of the each to-be-transmitted audio frame, so that different to-be-transmitted audio frames may have different quantities of copies, to obtain at least one redundancy data packet. By transmitting the at least one redundancy data packet to the target terminal, a probability of the target terminal receiving each to-be-transmitted audio frame can be increased based on a redundant transmission mechanism, so as to resist a packet loss phenomenon in data transmission. Different corrected redundancy multiples are allocated for to-be-transmitted audio frames carrying different amounts of information, so that network congestion caused by the redundant transmission mechanism can be avoided, thereby optimizing a resource configuration solution of a system bandwidth under the redundant transmission mechanism. The network anti-packet loss effect can be improved without causing network congestion, no matter in a scenario of continuous and sudden massive packet loss or in a scenario of high real-time performance.

Figure 3:
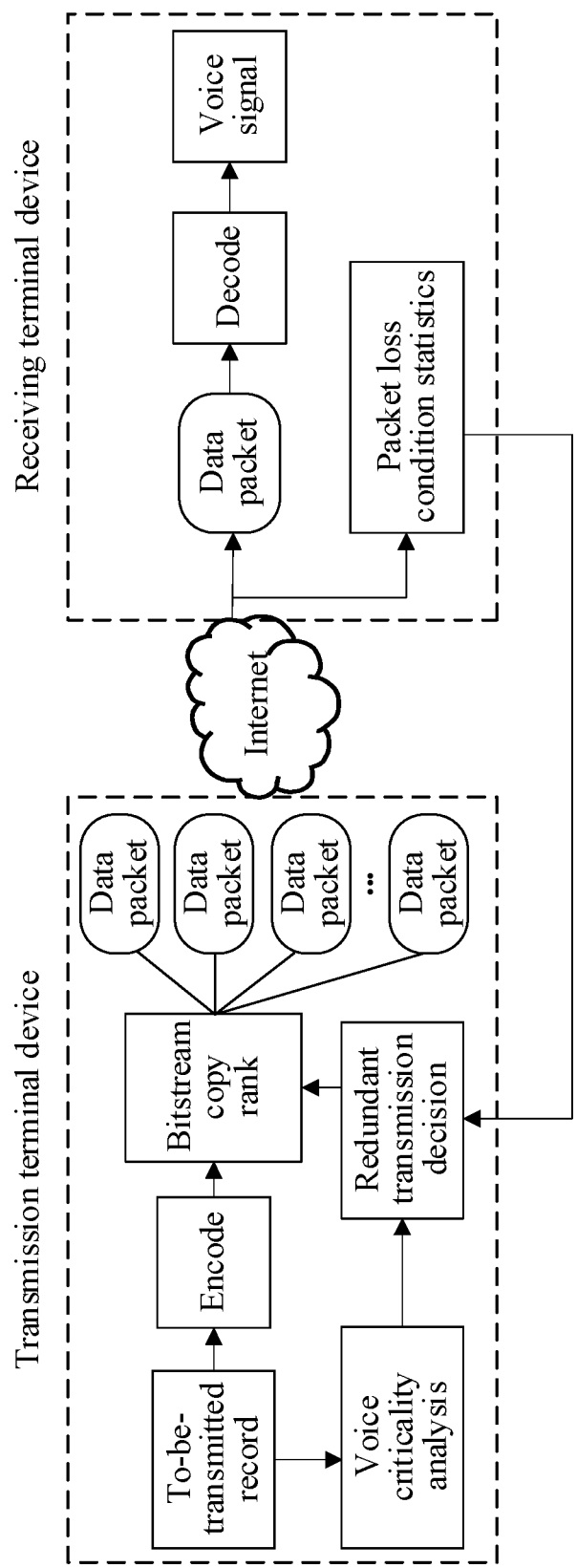
FIG. 3 is a schematic diagram of a principle of a data transmission method according to an embodiment of the present disclosure.

FIG. 3 is a schematic diagram of a principle of a data transmission method according to an embodiment of the present disclosure. FIG. 3 shows an audio data transmission procedure between a transmission terminal device and a receiving terminal device. After the transmission terminal device obtains a to-be-transmitted record, on the one hand, the transmission terminal device encodes the to-be-transmitted record to generate an audio bitstream. On the other hand, the transmission terminal device performs voice criticality analysis on the to-be-transmitted record, to determine a criticality level of each to-be-transmitted audio frame in the to-be-transmitted record. To-be-transmitted audio frames with different criticality levels correspond to different redundant transmission factors. The transmission terminal device determines a current redundancy multiple matching a current packet loss condition according to feedback information of the receiving terminal device for the current packet loss condition, and obtains a corrected redundancy multiple of each to-be-transmitted audio frame according to a current redundancy multiple and a redundant transmission factor corresponding to the criticality level corresponding to each to-be-transmitted audio frame. The foregoing process of determining a corrected redundancy multiple of each to-be-transmitted audio frame may alternatively be referred to as a "redundant transmission decision". The transmission terminal device duplicates each to-be-transmitted audio frame of an encoded audio bitstream based on the corrected redundancy multiple of each to-be-transmitted audio frame for a plurality of times, so that a quantity of copies of each to-be-transmitted audio frame is equal to the corrected redundancy multiple of each to-be-transmitted audio frame; encapsulates each to-be-transmitted audio frame obtained through duplication as at least one redundancy data packet; ranking the redundancy data packets according to a certain rule; and allocating the redundancy data packets in a transmission queue corresponding to the receiving terminal device evenly. The transmission terminal device transmits an audio data packet carrying an audio bitstream and at least one redundancy data packet to the receiving terminal device through network. An audio bitstream and a redundancy bitstream (that is, a bitstream formed by at least one redundancy data packet obtained through duplication) actually have the same bitstream data. Therefore, for the same piece of audio data, the receiving terminal device only needs to obtain any one of an audio data packet and a redundancy data packet from the network. The receiving terminal device arranges data packets according to sequence numbers of the data packets (audio data packets or redundancy data packets), and reserves, in a case of detecting that a plurality of data packets having the same sequence numbers are received, any data packet having the sequence number, and filters other received repeated data packets. After the filtering is finished, the receiving terminal device decodes the data packets after the arranging by using a decoder to obtain a sound signal, further to display the sound signal. The receiving terminal device may further collect statistics on a current packet loss condition such as a packet loss rate, a network latency, and a network fluctuation, and transmit a current packet loss condition obtained through statistics to the transmission terminal device, so that the transmission terminal device adjusts a current redundancy multiple used in a next audio data transmission according to the current packet loss condition in time.

In the foregoing process, a criticality (may also be referred to as importance) of each to-be-transmitted audio frame is analyzed, and therefore, some non-voice frames that carry a relatively small an amount of information, such as a silence frame and a noise frame, are non-key frames. Even if the network packet loss occurs to these non-key frames, the audio transmission effect (such as a VoIP call effect) is not affected. Therefore, it is unnecessary to use excessive bandwidth resources to perform redundant transmission on the non-key frames to ensure transmission reliability of the non-key frames. Therefore, a relatively low corrected redundancy multiple may be allocated for the non-key frames based on a redundant transmission decision. On the contrary, some voice key frames that carry a relatively large an amount of information, for example, a voice initial frame transmitting from a non-voice frame to a voice frame, and a voice frame whose voice tone has changed, are key frames. If the packet loss occurs to these key frames during a weak network transmission, the audio transmission effect (for example, the VoIP call effect) is affected, so that a problem of a freezing and incoherent voice or a volume jumping up and down occurs when the receiving terminal device plays a sound signal, which greatly reduces user experience of a receiver. Therefore, a relatively high corrected redundancy multiple may be allocated for the key frame based on the redundancy multiple decision to ensure transmission reliability of the frame, that is, to ensure that a data packet in which the key frame is located is not lost, so as to resolve a network packet loss problem of a key frame. In this case, in a case of limited bandwidth system, a reasonable resource allocation solution can make use of limited bandwidth resources to have the good anti-packet loss effect, avoid network congestion caused by the redundancy multiple decision, and avoid more serious network packet loss problem caused by network congestion.

In this embodiment of the present disclosure, a redundancy multiple transmission manner applied in an audio transmission service is provided. In a redundancy transmission decision of the transmission manner, corrected redundancy multiples of to-be-transmitted audio frames are not only adjusted at any time with a change of a transmission network quality, but also changed according to a criticality of currently transmitted audio content, and therefore a to-be-transmitted audio frame with a high criticality can be better guaranteed during transmission. However, because a to-be-transmitted audio frame with a low criticality has a small impact on a sound quality, a relatively small corrected redundancy multiple is adopted for transmission, which can effectively use network bandwidth resources. Because a criticality of audio content in an audio real-time transmission process is fluctuated greatly, the redundancy multiple mechanism provided in the embodiments of the present disclosure can ensure a high quality of audio data transmission, and can realize a high reliable real-time audio transmission of services such as VoIP, audio broadcast, and audio and video broadcasting. The anti-packet loss effect can be greatly improved not only in a scenario of continuous and sudden massive packet loss or in a scenario of high real-time performance.

Figure 4:
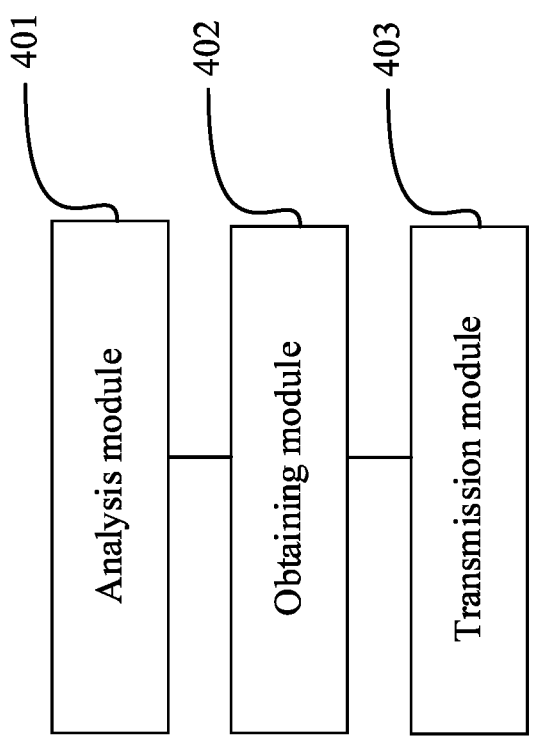
FIG. 4 is a schematic structural diagram of a data transmission apparatus according to an embodiment of the present disclosure.

FIG. 4 is a schematic structural diagram of a data transmission apparatus according to an embodiment of the present disclosure. Referring to FIG. 4, the apparatus includes:

an analysis module 401, configured to perform voice criticality analysis on a to-be-transmitted audio to obtain a criticality level of each to-be-transmitted audio frame in the to-be-transmitted audio, the criticality level being used for measuring an amount of information carried in the audio frame; different criticality levels being correspond to different redundant transmission factors, and the criticality level being positively correlated to a size of the redundant transmission factor, that is, the analysis module 401 is configured to perform voice criticality analysis on a to-be-transmitted audio to obtain a criticality level of at least one to-be-transmitted audio frame in the to-be-transmitted audio, the criticality level being used for measuring an amount of information carried in the audio frame;

an obtaining module 402, configured to obtain a corrected redundancy multiple of each to-be-transmitted audio frame according to a current redundancy multiple and a redundant transmission factor corresponding to the criticality level corresponding to each to-be-transmitted audio frame, the current redundancy multiple being determined based on a current packet loss condition of a target terminal, and the corrected redundancy multiple of each to-be-transmitted audio frame being used for representing a quantity of redundant transmissions of each to-be-transmitted audio frame, that is, the obtaining module 402 is configured to obtain a quantity of redundant transmissions of the at least one to-be-transmitted audio frame according to a current redundancy multiple and a redundant transmission factor corresponding to the criticality level, the criticality level being positively correlated with a size of the redundant transmission factor, and the current redundancy multiple being determined based on a current packet loss condition of a target terminal; and a transmission module 403, configured to duplicate each to-be-transmitted audio frame according to a corrected redundancy multiple of each to-be-transmitted audio frame, to obtain at least one redundancy data packet, and transmit the at least one redundancy data packet of each to-be-transmitted audio frame to the target terminal, that is, the transmission module 403 is configured to duplicate the at least one to-be-transmitted audio frame according to the quantity of redundant transmissions to obtain at least one redundancy data packet, and transmit the at least one redundancy data packet to the target terminal.

According to the apparatus provided in the embodiments of the present disclosure, voice criticality analysis is performed on a to-be-transmitted audio to obtain a criticality level of each to-be-transmitted audio frame in the to-be-transmitted audio, and a corrected redundancy multiple of each to-be-transmitted audio frame is obtained according to a current redundancy multiple and a redundant transmission factor corresponding to the criticality level of each to-be-transmitted audio frame. The current redundancy multiple is determined based on a current packet loss condition of a target terminal, and the corrected redundancy multiple of each to-be-transmitted audio frame is used for representing a quantity of redundant transmissions of each to-be-transmitted audio frame. Because the criticality level is used for measuring an amount of information carried in the audio frame, different criticality levels correspond to different redundant transmission factors, and the criticality level is positively correlated to a size of the redundant transmission factor. That is, a to-be-transmitted audio frame with a higher criticality level corresponds to a redundant transmission factor with a larger numerical value, so that a corrected redundancy multiple with a larger numerical value may be obtained. Each to-be-transmitted audio frame is duplicated according to a corrected redundancy multiple of the each to-be-transmitted audio frame, so that different to-be-transmitted audio frames may have different quantities of copies, to obtain at least one redundancy data packet. By transmitting the at least one redundancy data packet to the target terminal, a probability of the target terminal receiving each to-be-transmitted audio frame can be increased based on a redundancy multiple mechanism, so as to resist a packet loss phenomenon in data transmission. Different corrected redundancy multiples are allocated for to-be-transmitted audio frames carrying different amounts of information, so that network congestion caused by the redundant transmission mechanism can be avoided, thereby optimizing a resource configuration solution of a system bandwidth under the redundant transmission mechanism. The network anti-packet loss effect can be improved without causing network congestion, no matter in a scenario of continuous and sudden massive packet loss or in a scenario of high real-time performance.

In a possible implementation, based on an apparatus composition of FIG. 4, the analysis module 401 includes:

an obtaining unit, configured to obtain, for any to-be-transmitted audio frame in the to-be-transmitted audio, at least one of energy change information, VAD information, and fundamental frequency change information of the to-be-transmitted audio frame; and a determining unit, configured to determine a criticality level of the to-be-transmitted audio frame according to at least one of the energy change information, the VAD information, and the fundamental frequency change information of the to-be-transmitted audio frame.

In a possible implementation, the determining unit is configured to:

determine whether the to-be-transmitted audio frame meets a determining criterion of each level separately, and obtain, when the to-be-transmitted audio frame meets a determining criterion of at least one level, the criticality level of the to-be-transmitted audio frame as a level with a highest criticality in the at least one level, the determining criterion of each level being related to at least one of the energy change information, the VAD information, and the fundamental frequency change information of the to-be-transmitted audio frame.

In a possible implementation, the determining unit is configured to:

determine whether the to-be-transmitted audio frame meets a determining criterion of each level in descending order of criticalities, the determining criterion of each level being related to at least one of the energy change information, the VAD information, and the fundamental frequency change information of the to-be-transmitted audio frame;

obtain, when the to-be-transmitted audio frame meets a determining criterion of a current level, the criticality level of the to-be-transmitted audio frame as the current level; and perform, when the to-be-transmitted audio frame does not meet a determining criterion of the current level, an operation of determining whether the to-be-transmitted audio frame meets a determining criterion of a next level.

In a possible implementation, the criticality level includes a first level, a second level, a third level, and a fourth level.

A determining criterion of the first level includes the following: a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is greater than a target threshold.

A determining criterion of the second level includes the following: a VAD value of the to-be-transmitted audio frame is 1, a VAD value of a previous to-be-transmitted audio frame of the to-be-transmitted audio frame is 1, and an energy value of the to-be-transmitted audio frame is greater than a target multiple of an energy value of the previous to-be-transmitted audio frame; or a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is greater than the target threshold.

A determining criterion of the third level includes that a VAD value of the to-be-transmitted audio frame is 1.

A determining criterion of the fourth level includes that a VAD value of the to-be-transmitted audio frame is 0.

In a possible implementation, the obtaining module 402 is configured to:

determine, for any to-be-transmitted audio frame, a numerical value obtained by multiplying a redundant transmission factor corresponding to a criticality level of the to-be-transmitted audio frame and the current redundancy multiple as a corrected redundancy multiple (that is, the quantity of redundant transmissions) of the to-be-transmitted audio frame.

In a possible implementation, the transmission module 403 is configured to:

encode the to-be-transmitted audio to obtain an audio bitstream;

duplicate each to-be-transmitted audio frame in the audio bitstream for a plurality of times, until a quantity of copies of each to-be-transmitted audio frame reaches a corrected redundancy multiple of each to-be-transmitted audio frame, to obtain a plurality of redundant audio frames; and encapsulate the plurality of redundant audio frames as the at least one redundancy data packet.

That is, the transmission module 403 is configured to:

encode the to-be-transmitted audio to obtain an audio bitstream;

duplicate each of at least one to-be-transmitted audio frame in the audio bitstream for a plurality of times, until a quantity of copies reaches a quantity of redundant transmissions of each of the at least one to-be-transmitted audio frame, to obtain a plurality of redundant audio frames; and encapsulate the plurality of redundant audio frames as the at least one redundancy data packet.

Any combination of the foregoing optional technical solutions may be used to form an optional embodiment of the present disclosure. Details are not described herein.

When the data transmission apparatus provided in the foregoing embodiment transmits data, a description is given only by using the foregoing division of function modules as an example. In actual applications, the functions may be allocated to and implemented by different function modules according to the requirements, that is, the internal structure of the terminal device may be divided into different function modules, to implement all or some of the functions described above. In addition, the data transmission apparatus and data transmission method embodiments provided in the foregoing embodiments belong to the same conception. For the specific implementation process, refer to the data transmission method embodiments, so the details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 5:
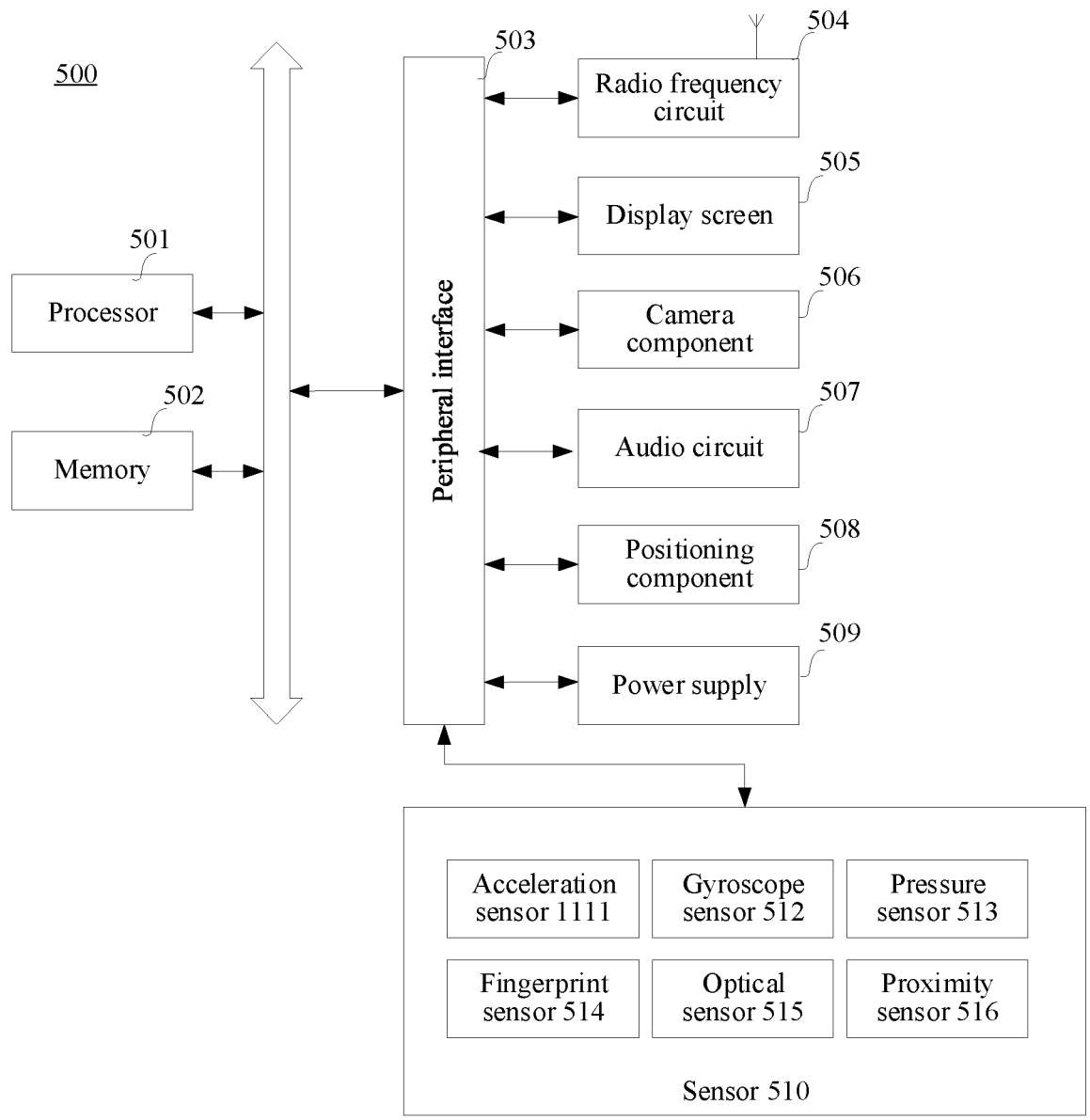
FIG. 5 is a schematic structural diagram of a terminal according to an embodiment of the present disclosure.

FIG. 5 is a schematic structural diagram of a terminal according to an embodiment of the present disclosure. The terminal 500 may be a smartphone, a tablet computer, an MP3 player, an MP4 player, a notebook computer, or a desktop computer. The terminal 500 may also be referred to as a user equipment, a portable terminal, a laptop terminal, a desktop terminal, or another name.

Generally, the terminal 500 includes: a processor 501 and a memory 502.

The processor 501 may include one or more processing cores. For example, the processor may be a 4-core processor or an 8-core processor. The processor 501 may be implemented by using at least one hardware form of a digital signal processor (DSP), a field-programmable gate array (FPGA), and a programmable logic array (PLA). The processor 501 may alternatively include a main processor and a coprocessor. The main processor is configured to process data in an active state, also referred to as a central processing unit (CPU). The coprocessor is a low-power processor configured to process data in a standby state. In some embodiments, the processor 501 may be integrated with a graphics processing unit (GPU). The GPU is configured to render and draw content that needs to be displayed on a display. In some embodiments, the processor 501 may further include an artificial intelligence (AI) processor. The AI processor is configured to process computing operations related to machine learning.

The memory 502 may include one or more computer-readable storage media that may be non-transitory. The memory 502 may further include a high-speed random access memory (RAM), and a non-volatile memory such as one or more magnetic disk storage devices or flash storage devices. In some embodiments, a non-transitory computer-readable storage medium in the memory 502 is configured to store at least one instruction, the at least one instruction being configured to be executed by the processor 501 to implement the data transmission method provided in the embodiments of the present disclosure.

In some embodiments, the terminal 500 may optionally include a peripheral interface 503 and at least one peripheral. The processor 501, the memory 502, and the peripheral interface 503 may be connected through a bus or a signal cable. Each peripheral may be connected to the peripheral interface 503 through a bus, a signal cable, or a circuit board. In some embodiments, the peripheral includes: at least one of a radio frequency (RF) circuit 504, a display screen 505, a camera component 506, an audio circuit 507, a positioning component 508, and a power supply 509.

The peripheral interface 503 may be configured to connect at least one peripheral related to input/output (I/O) to the processor 501 and the memory 502. In some embodiments, the processor 501, the memory 502, and the peripheral interface 503 are integrated on the same chip or the same circuit board. In some other embodiments, any or both of the processor 501, the memory 502, and the peripheral interface 503 may be implemented on an independent chip or circuit board. This is not limited in this embodiment.

The RF circuit 504 is configured to receive and transmit an RF signal, which is also referred to as an electromagnetic signal. The RF circuit 504 communicates with a communication network and other communication devices through the electromagnetic signal. The RF circuit 504 converts an electrical signal into an electromagnetic signal for transmission, or converts a received electromagnetic signal into an electrical signal. In some embodiments, the RF circuit 504 includes: an antenna system, an RF transceiver, one or more amplifiers, a tuner, an oscillator, a digital signal processor, a codec chip set, a subscriber identity module card, and the like. The RF circuit 504 may communicate with another terminal by using at least one wireless communication protocol. The wireless communication protocol includes, but is not limited to, a metropolitan area network, generations of mobile communication networks (2G, 3G, 4G, and 5G), a wireless local area network, and/or a wireless fidelity (Wi-Fi) network. In some embodiments, the RF circuit 504 may further include a circuit related to Near-Field Communication (NFC), which is not limited in the present disclosure.

The display screen 505 is configured to display a user interface (UI). The UI may include a graphic, text, an icon, a video, and any combination thereof. When the display screen 505 is a touch display screen, the display screen 505 also has a capability to collect a touch signal on or above a surface of the display screen 505. The touch signal may be inputted, as a control signal, to the processor 501 for processing. In this case, the display screen 505 may be further configured to provide a virtual button and/or a virtual keyboard, which is also referred to as a soft button and/or a soft keyboard. In some embodiments, there may be one display screen 505, disposed on a front panel of the terminal 500. In some other embodiments, there may be at least two display screens 505, disposed on different surfaces of the terminal 500 respectively or in a folded design. In still other embodiments, the display screen 505 may be a flexible display screen, disposed on a curved surface or a folded surface of the terminal 500. The display screen 505 may further be set to have a non-rectangular irregular graph, that is, a special-shaped screen. The display screen 505 may be prepared by using materials such as a liquid crystal display (LCD), an organic light-emitting diode (OLED), or the like.

The camera component 506 is configured to collect an image or a video. In some embodiments, the camera component 506 includes a front-facing camera and a rear-facing camera. Generally, the front-facing camera is disposed on a front panel of the terminal, and the rear-facing camera is disposed on a rear surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera component 506 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 507 may include a microphone and a speaker. The microphone is configured to collect sound waves of users and surroundings, and convert the sound waves into electrical signals and input the signals to the processor 501 for processing, or input the signals to the RF circuit 504 to implement voice communication. For a purpose of stereo acquisition or noise reduction, there may be a plurality of microphones disposed at different portions of the terminal 500. The microphone may be further an array microphone or an omnidirectional microphone. The speaker is configured to convert electric signals from the processor 501 or the RF circuit 504 into sound waves. The speaker may be a conventional thin-film speaker or a piezoelectric ceramic speaker. When the speaker is the piezoelectric ceramic speaker, electric signals not only may be converted into sound waves that can be heard by human, but also may be converted into sound waves that cannot be heard by human for ranging and the like. In some embodiments, the audio circuit 507 may also include an earphone jack.

The positioning component 508 is configured to determine a current geographic location of the terminal 500, to implement navigation or a location-based service (LBS). The positioning component 508 may be a positioning component based on the global positioning system (GPS) of the United States, the BeiDou Navigation Satellite System (BDS) of China, the GLONASS System of Russia, or the GALILEO System of the European Union.

The power supply 509 is configured to supply power to components in the terminal 500. The power supply 509 may be an alternating current, a direct current, a primary battery, or a rechargeable battery. When the power supply 509 includes a rechargeable battery, the rechargeable battery may be a wired rechargeable battery or a wireless rechargeable battery. The rechargeable battery may be further configured to support a fast charge technology.

In some embodiments, the terminal 500 may further include one or more sensors 510. The one or more sensors 510 include, but are not limited to, an acceleration sensor 511, a gyroscope sensor 512, a pressure sensor 513, a fingerprint sensor 514, an optical sensor 515, and a proximity sensor 516.

The acceleration sensor 511 may detect a magnitude of acceleration on three coordinate axes of a coordinate system established with the terminal 500. For example, the acceleration sensor 511 may be configured to detect components of gravity acceleration on the three coordinate axes. The processor 501 may control, according to a gravity acceleration signal collected by the acceleration sensor 511, the display screen 505 to display the UI in a frame view or a portrait view. The acceleration sensor 511 may be further configured to collect data of a game or a user movement.

The gyroscope sensor 512 may detect a body direction and a rotation angle of the terminal 500, and the gyroscope sensor 512 may work with the acceleration sensor 511 to collect a 3D action performed by the user on the terminal 500. The processor 501 may implement the following functions according to the data collected by the gyroscope sensor 512: motion sensing (for example, changing the UI according to a tilt operation of the user), image stabilization during shooting, game control, and inertial navigation.

The pressure sensor 513 may be disposed on a side frame of the terminal 500 and/or a lower layer of the display screen 505. When the pressure sensor 513 is disposed at the side frame of the terminal 500, a holding signal of the user on the terminal 500 may be detected, and the processor 501 performs left/right hand recognition or a quick operation according to the holding signal collected by the pressure sensor 513. When the pressure sensor 513 is disposed on the low layer of the display screen 505, the processor 501 controls, according to a pressure operation of the user on the display screen 505, an operable control on the UI. The operable control includes at least one of a button control, a scroll-bar control, an icon control, and a menu control.

The fingerprint sensor 514 is configured to collect a fingerprint of a user, and the processor 501 recognizes an identity of the user according to the fingerprint collected by the fingerprint sensor 514, or the fingerprint sensor 514 recognizes the identity of the user based on the collected fingerprint. When identifying that the user's identity is a trusted identity, the processor 501 authorizes the user to perform related sensitive operations. The sensitive operations include: unlocking a screen, viewing encrypted information, downloading software, paying, changing a setting, and the like. The fingerprint sensor 514 may be disposed on a front surface, a back surface, or a side surface of the terminal 500. When a physical button or a vendor logo is disposed on the terminal 500, the fingerprint 514 may be integrated with the physical button or the vendor logo.

The optical sensor 515 is configured to collect ambient light intensity. In an embodiment, the processor 501 may control display luminance of the display screen 505 according to the ambient light intensity collected by the optical sensor 515. In some embodiments, when the ambient light intensity is relatively high, the display luminance of the display screen 505 is increased, and when the ambient light intensity is relatively low, the display luminance of the touch display screen 505 is reduced. In another embodiment, the processor 501 may further dynamically adjust a photographing parameter of the camera component 506 according to the ambient light intensity collected by the optical sensor 515.

The proximity sensor 516, also referred to as a distance sensor, is generally disposed on the front panel of the terminal 500. The proximity sensor 516 is configured to collect a distance between the user and the front surface of the terminal 500. In an embodiment, when the proximity sensor 516 detects that the distance between the user and the front surface of the terminal 500 gradually becomes small, the display screen 505 is controlled by the processor 501 to switch from a screen-on state to a screen-off state. When the proximity sensor 516 detects that the distance between the user and the front surface of the terminal 500 gradually increases, the display screen 505 is controlled by the processor 501 to switch from the screen-off state to the screen-on state.

A person skilled in the art may understand that the structure shown in FIG. 5 constitutes no limitation on the terminal 500, and the terminal may include more or fewer components than those shown in the figure, or some components may be combined, or a different component deployment may be used.

In some embodiments, the terminal includes one or more processors and one or more memories, the one or more memories storing at least one piece of program code, the at least one piece of program code being loaded and executed by the one or more processors to implement the following operations:

performing voice criticality analysis on a to-be-transmitted audio to obtain a criticality level of at least one to-be-transmitted audio frame in the to-be-transmitted audio, the criticality level being used for measuring an amount of information carried in the audio frame;

obtaining a quantity of redundant transmissions of the at least one to-be-transmitted audio frame according to a current redundancy multiple and a redundant transmission factor corresponding to the criticality level, the criticality level being positively correlated with a size of the redundant transmission factor, and the current redundancy multiple being determined based on a current packet loss condition of a target terminal; and duplicate the at least one to-be-transmitted audio frame according to the quantity of redundant transmissions to obtain at least one redundancy data packet, and transmit the at least one redundancy data packet to the target terminal.

In some embodiments, the at least one piece of program code is loaded and executed by the one or more processors to implement the following operations:

obtaining, for any to-be-transmitted audio frame, at least one of energy change information, VAD information, and fundamental frequency change information of the to-be-transmitted audio frame; and determining a criticality level of the to-be-transmitted audio frame according to at least one of the energy change information, the VAD information, and the fundamental frequency change information of the to-be-transmitted audio frame.

In some embodiments, the at least one piece of program code is loaded and executed by the one or more processors to implement the following operations:

determining whether the to-be-transmitted audio frame meets a determining criterion of each level separately, and obtaining, when the to-be-transmitted audio frame meets a determining criterion of at least one level, the criticality level of the to-be-transmitted audio frame as a level with a highest criticality in the at least one level, the determining criterion of each level being related to at least one of the energy change information, the VAD information, and the fundamental frequency change information of the to-be-transmitted audio frame.

In some embodiments, the at least one piece of program code is loaded and executed by the one or more processors to implement the following operations:

determining whether the to-be-transmitted audio frame meets a determining criterion of each level in descending order of criticalities, the determining criterion of each level being related to at least one of the energy change information, the VAD information, and the fundamental frequency change information of the to-be-transmitted audio frame;

obtaining, when the to-be-transmitted audio frame meets a determining criterion of a current level, the criticality level of the to-be-transmitted audio frame as the current level; and performing, when the to-be-transmitted audio frame does not meet a determining criterion of the current level, an operation of determining whether the to-be-transmitted audio frame meets a determining criterion of a next level.

In some embodiments, the criticality level includes a first level, a second level, a third level, and a fourth level.

A determining criterion of the first level includes the following: a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is greater than a target threshold.

A determining criterion of the second level includes the following: a VAD value of the to-be-transmitted audio frame is 1, a VAD value of a previous to-be-transmitted audio frame of the to-be-transmitted audio frame is 1, and an energy value of the to-be-transmitted audio frame is greater than a target multiple of an energy value of the previous to-be-transmitted audio frame; or a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is greater than the target threshold.

A determining criterion of the third level includes that a VAD value of the to-be-transmitted audio frame is 1.

A determining criterion of the fourth level includes that a VAD value of the to-be-transmitted audio frame is 0.

In some embodiments, the at least one piece of program code is loaded and executed by the one or more processors to implement the following operation:

determining, for any to-be-transmitted audio frame, a numerical value obtained by multiplying a redundant transmission factor corresponding to a criticality level of the to-be-transmitted audio frame and the current redundancy multiple as a quantity of redundant transmissions of the to-be-transmitted audio frame.

In some embodiments, the at least one piece of program code is loaded and executed by the one or more processors to implement the following operations:

encoding the to-be-transmitted audio to obtain an audio bitstream;

duplicating each of at least one to-be-transmitted audio frame in the audio bitstream for a plurality of times, until a quantity of copies reaches a quantity of redundant transmissions of each of the at least one to-be-transmitted audio frame, to obtain a plurality of redundant audio frames; and encapsulating the plurality of redundant audio frames as the at least one redundancy data packet.

In an exemplary embodiment, a non-transitory computer-readable storage medium, for example, a memory including at least one piece of program code is further provided. The at least one piece of program code may be executed by a processor in a terminal to implement the data transmission method in the foregoing embodiments. For example, the computer-readable storage medium may be a read-only memory (ROM), a RAM, a compact disc read-only memory (CD-ROM), a magnetic tape, a floppy disk, an optical data storage device, or the like.

In some embodiments, the at least one piece of program code is loaded and executed by the processor to implement the following operations:

performing voice criticality analysis on a to-be-transmitted audio to obtain a criticality level of at least one to-be-transmitted audio frame in the to-be-transmitted audio, the criticality level being used for measuring an amount of information carried in the audio frame;

obtaining a quantity of redundant transmissions of the at least one to-be-transmitted audio frame according to a current redundancy multiple and a redundant transmission factor corresponding to the criticality level, the criticality level being positively correlated with a size of the redundant transmission factor, and the current redundancy multiple being determined based on a current packet loss condition of a target terminal; and duplicating the at least one to-be-transmitted audio frame according to the quantity of redundant transmissions to obtain at least one redundancy data packet, and transmit the at least one redundancy data packet to the target terminal.

In some embodiments, the at least one piece of program code is loaded and executed by the processor to implement the following operations:

obtaining, for any to-be-transmitted audio frame, at least one of energy change information, VAD information, and fundamental frequency change information of the to-be-transmitted audio frame; and determining a criticality level of the to-be-transmitted audio frame according to at least one of the energy change information, the VAD information, and the fundamental frequency change information of the to-be-transmitted audio frame.

In some embodiments, the at least one piece of program code is loaded and executed by the processor to implement the following operations:

determining whether the to-be-transmitted audio frame meets a determining criterion of each level separately, and obtaining, when the to-be-transmitted audio frame meets a determining criterion of at least one level, the criticality level of the to-be-transmitted audio frame as a level with a highest criticality in the at least one level, the determining criterion of each level being related to at least one of the energy change information, the VAD information, and the fundamental frequency change information of the to-be-transmitted audio frame.

In some embodiments, the at least one piece of program code is loaded and executed by the processor to implement the following operations:

determining whether the to-be-transmitted audio frame meets a determining criterion of each level in descending order of criticalities, the determining criterion of each level being related to at least one of the energy change information, the VAD information, and the fundamental frequency change information of the to-be-transmitted audio frame;

obtaining, when the to-be-transmitted audio frame meets a determining criterion of a current level, the criticality level of the to-be-transmitted audio frame as the current level; and performing, when the to-be-transmitted audio frame does not meet a determining criterion of the current level, an operation of determining whether the to-be-transmitted audio frame meets a determining criterion of a next level.

In some embodiments, the criticality level includes a first level, a second level, a third level, and a fourth level.

A determining criterion of the first level includes the following: a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is greater than a target threshold.

A determining criterion of the second level includes the following: a VAD value of the to-be-transmitted audio frame is 1, a VAD value of a previous to-be-transmitted audio frame of the to-be-transmitted audio frame is 1, and an energy value of the to-be-transmitted audio frame is greater than a target multiple of an energy value of the previous to-be-transmitted audio frame; or a VAD value of the to-be-transmitted audio frame is 1, and a VAD value of a previous to-be-transmitted audio frame of the to-be-transmitted audio frame is 0 and an absolute value of a difference between fundamental frequency values of the to-be-transmitted audio frame and the previous to-be-transmitted audio frame is greater than the target threshold.

A determining criterion of the third level includes that a VAD value of the to-be-transmitted audio frame is 1.

A determining criterion of the fourth level includes that a VAD value of the to-be-transmitted audio frame is 0.

In some embodiments, the at least one piece of program code is loaded and executed by the processor to implement the following operation:

determining, for any to-be-transmitted audio frame, a numerical value obtained by multiplying a redundant transmission factor corresponding to a criticality level of the to-be-transmitted audio frame and the current redundancy multiple as a quantity of redundant transmissions of the to-be-transmitted audio frame.

In some embodiments, the at least one piece of program code is loaded and executed by the processor to implement the following operations:

encoding the to-be-transmitted audio to obtain an audio bitstream;

duplicating each of at least one to-be-transmitted audio frame in the audio bitstream for a plurality of times, until a quantity of copies reaches a quantity of redundant transmissions of each of the at least one to-be-transmitted audio frame, to obtain a plurality of redundant audio frames; and encapsulating the plurality of redundant audio frames as the at least one redundancy data packet.

In some embodiments, a computer program product including instructions is provided, the computer program product, when running on a computer, causing the computer to perform any implementation in a data transmission method according to the foregoing embodiments.

Persons of ordinary skill in the art may understand that all or some of the steps of the foregoing embodiments may be implemented by using hardware, or may be implemented by a program instructing relevant hardware. The program may be stored in a non-transitory computer-readable storage medium. The above-mentioned non-transitory computer-readable storage medium may be a read-only memory, a magnetic disk, an optical disc, or the like.

The foregoing descriptions are embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A data transmission method performed by a computer device, the method comprising:

performing voice criticality analysis on a to-be-transmitted audio to obtain a criticality level of at least one to-be-transmitted audio frame in the to-be-transmitted audio, the criticality level being used for measuring an amount of information carried in the audio frame, wherein the performing voice criticality analysis comprises:

obtaining, for any to-be-transmitted audio frame, energy change information, voice activity detection (VAD) information, and fundamental frequency change information of the to-be-transmitted audio frame, and determining a criticality level of the to-be-transmitted audio frame according to a subset including one or more of the energy change information, the VAD information, and the fundamental frequency change information of the to-be- transmitted audio frame, wherein the subset is determined based on a determining criterion of the criticality level;

obtaining a quantity of redundant transmissions of the at least one to-be-transmitted audio frame according to a current redundancy multiple and a redundant transmission factor corresponding to the criticality level, the criticality level being positively correlated with a size of the redundant transmission factor, and the current redundancy multiple being determined based on a current packet loss condition of a target terminal; and duplicating the at least one to-be-transmitted audio frame according to the quantity of redundant transmissions to obtain at least one redundancy data packet, and transmitting the at least one redundancy data packet to the target terminal.

2. The method according to claim 1, wherein the determining a criticality level of the to-be-transmitted audio frame comprises:

determining whether the to-be-transmitted audio frame meets a determining criterion of each level separately, and obtaining, when the to-be-transmitted audio frame meets a determining criterion of at least one level, the criticality level of the to-be-transmitted audio frame as a level with a highest criticality in the at least one level, the determining criterion of each level being related to at least one of the energy change information, the VAD information, and the fundamental frequency change information of the to-be-transmitted audio frame.

3. The method according to claim 1, wherein the determining a criticality level of the to-be-transmitted audio frame comprises:

determining whether the to-be-transmitted audio frame meets a determining criterion of each level in descending order of criticalities, the determining criterion of each level being related to at least one of the energy change information, the VAD information, and the fundamental frequency change information of the to-be-transmitted audio frame;

obtaining, when the to-be-transmitted audio frame meets a determining criterion of a current level, the criticality level of the to-be-transmitted audio frame as the current level; and performing, when the to-be-transmitted audio frame does not meet a determining criterion of the current level, an operation of determining whether the to-be-transmitted audio frame meets a determining criterion of a next level.

4. The method according to claim 1, wherein the criticality level comprises a first level, a second level, a third level, and a fourth level; and a determining criterion of the first level comprises: a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is greater than a target threshold;
a determining criterion of the second level comprises: a VAD value of the to-be-transmitted audio frame is 1, a VAD value of a previous to-be-transmitted audio frame of the to-be-transmitted audio frame is 1, and an energy value of the to-be-transmitted audio frame is greater than a target multiple of an energy value of the previous to-be-transmitted audio frame; or a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is less than or equal to the target threshold;
a determining criterion of the third level comprises that a VAD value of the to-be-transmitted audio frame is 1; and
a determining criterion of the fourth level comprises that a VAD value of the to-be-transmitted audio frame is 0.

5. The method according to claim 1, wherein the obtaining a quantity of redundant transmissions of the at least one to-be-transmitted audio frame according to a current redundancy multiple and a redundant transmission factor corresponding to the criticality level comprises:
determining, for any to-be-transmitted audio frame, a numerical value obtained by multiplying a redundant transmission factor corresponding to a criticality level of the to-be-transmitted audio frame and the current redundancy multiple as a quantity of redundant transmissions of the to-be-transmitted audio frame, wherein the redundant transmission factor has a non-zero probability value.

6. The method according to claim 1, wherein the duplicating the at least one to-be-transmitted audio frame according to the quantity of redundant transmissions to obtain at least one redundancy data packet comprises:
encoding the to-be-transmitted audio to obtain an audio bitstream;
duplicating each of at least one to-be-transmitted audio frame in the audio bitstream for a plurality of times, until a quantity of copies reaches a quantity of redundant transmissions of each of the at least one to-be-transmitted audio frame, to obtain a plurality of redundant audio frames; and
encapsulating the plurality of redundant audio frames as the at least one redundancy data packet.

7. A computer device, comprising one or more processors and one or more memories, the one or more memories storing at least one computer program, the at least one computer program being loaded and executed by the one or more processors to perform a plurality of operations including:
performing voice criticality analysis on a to-be-transmitted audio to obtain a criticality level of at least one to-be-transmitted audio frame in the to-be-transmitted audio, the criticality level being used for measuring an amount of information carried in the audio frame, wherein the performing voice criticality analysis comprises:
obtaining, for any to-be-transmitted audio frame, energy change information, voice activity detection (VAD) information, and fundamental frequency change information of the to-be-transmitted audio frame, and
determining a criticality level of the to-be-transmitted audio frame according to a subset including one or more of the energy change information, the VAD information, and the fundamental frequency change information of the to-be-transmitted audio frame, wherein the subset is determined based on a determining criterion of the criticality level;
obtaining a quantity of redundant transmissions of the at least one to-be-transmitted audio frame according to a current redundancy multiple and a redundant transmission factor corresponding to the criticality level, the criticality level being positively correlated with a size of the redundant transmission factor, and the current redundancy multiple being determined based on a current packet loss condition of a target terminal; and
duplicating the at least one to-be-transmitted audio frame according to the quantity of redundant transmissions to obtain at least one redundancy data packet, and transmitting the at least one redundancy data packet to the target terminal.

8. The computer device according to claim 7, wherein the determining a criticality level of the to-be-transmitted audio frame comprises:
determining whether the to-be-transmitted audio frame meets a determining criterion of each level separately, and obtaining, when the to-be-transmitted audio frame meets a determining criterion of at least one level, the criticality level of the to-be-transmitted audio frame as a level with a highest criticality in the at least one level, the determining criterion of each level being related to at least one of the energy change information, the VAD information, and the fundamental frequency change information of the to-be-transmitted audio frame.

9. The computer device according to claim 7, wherein the determining a criticality level of the to-be-transmitted audio frame comprises:
determining whether the to-be-transmitted audio frame meets a determining criterion of each level in descending order of criticalities, the determining criterion of each level being related to at least one of the energy change information, the VAD information, and the fundamental frequency change information of the to-be-transmitted audio frame;
obtaining, when the to-be-transmitted audio frame meets a determining criterion of a current level, the criticality level of the to-be-transmitted audio frame as the current level; and
performing, when the to-be-transmitted audio frame does not meet a determining criterion of the current level, an operation of determining whether the to-be-transmitted audio frame meets a determining criterion of a next level.

10. The computer device according to claim 7, wherein the criticality level comprises a first level, a second level, a third level, and a fourth level; and
a determining criterion of the first level comprises: a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is greater than a target threshold;
a determining criterion of the second level comprises: a VAD value of the to-be-transmitted audio frame is 1, a VAD value of a previous to-be-transmitted audio frame of the to-be-transmitted audio frame is 1, and an energy value of the to-be-transmitted audio frame is greater than a target multiple of an energy value of the previous to-be-transmitted audio frame; or a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is less than or equal to the target threshold;

a determining criterion of the third level comprises that a VAD value of the to-be-transmitted audio frame is 1; and a determining criterion of the fourth level comprises that a VAD value of the to-be-transmitted audio frame is 0.

11. The computer device according to claim 7, wherein the obtaining a quantity of redundant transmissions of the at least one to-be-transmitted audio frame according to a current redundancy multiple and a redundant transmission factor corresponding to the criticality level comprises:

determining, for any to-be-transmitted audio frame, a numerical value obtained by multiplying a redundant transmission factor corresponding to a criticality level of the to-be-transmitted audio frame and the current redundancy multiple as a quantity of redundant transmissions of the to-be-transmitted audio frame, wherein the redundant transmission factor has a non-zero probability value.

12. The computer device according to claim 7, wherein the duplicating the at least one to-be-transmitted audio frame according to the quantity of redundant transmissions to obtain at least one redundancy data packet comprises:

encoding the to-be-transmitted audio to obtain an audio bitstream;

duplicating each of at least one to-be-transmitted audio frame in the audio bitstream for a plurality of times, until a quantity of copies reaches a quantity of redundant transmissions of each of the at least one to-be-transmitted audio frame, to obtain a plurality of redundant audio frames; and encapsulating the plurality of redundant audio frames as the at least one redundancy data packet.

13. A non-transitory computer-readable storage medium, storing at least one computer program, the at least one computer program being loaded and executed by a processor of a computer device to perform a plurality of operations including:

performing voice criticality analysis on a to-be-transmitted audio to obtain a criticality level of at least one to-be-transmitted audio frame in the to-be-transmitted audio, the criticality level being used for measuring an amount of information carried in the audio frame, wherein the performing voice criticality analysis comprises:

obtaining, for any to-be-transmitted audio frame, energy change information, voice activity detection (VAD) information, and fundamental frequency change information of the to-be-transmitted audio frame, and determining a criticality level of the to-be-transmitted audio frame according to a subset including one or more of the energy change information, the VAD information, and the fundamental frequency change information of the to-be-transmitted audio frame, wherein the subset is determined based on a determining criterion of the criticality level;

obtaining a quantity of redundant transmissions of the at least one to-be-transmitted audio frame according to a current redundancy multiple and a redundant transmission factor corresponding to the criticality level, the criticality level being positively correlated with a size of the redundant transmission factor, and the current redundancy multiple being determined based on a current packet loss condition of a target terminal; and duplicating the at least one to-be-transmitted audio frame according to the quantity of redundant transmissions to obtain at least one redundancy data packet, and transmitting the at least one redundancy data packet to the target terminal.

14. The non-transitory computer-readable storage medium according to claim 13, wherein the determining a criticality level of the to-be-transmitted audio frame comprises:

determining whether the to-be-transmitted audio frame meets a determining criterion of each level separately, and obtaining, when the to-be-transmitted audio frame meets a determining criterion of at least one level, the criticality level of the to-be-transmitted audio frame as a level with a highest criticality in the at least one level, the determining criterion of each level being related to at least one of the energy change information, the VAD information, and the fundamental frequency change information of the to-be-transmitted audio frame.

15. The non-transitory computer-readable storage medium according to claim 13, wherein the determining a criticality level of the to-be-transmitted audio frame comprises:

determining whether the to-be-transmitted audio frame meets a determining criterion of each level in descending order of criticalities, the determining criterion of each level being related to at least one of the energy change information, the VAD information, and the fundamental frequency change information of the to-be-transmitted audio frame;

obtaining, when the to-be-transmitted audio frame meets a determining criterion of a current level, the criticality level of the to-be-transmitted audio frame as the current level; and performing, when the to-be-transmitted audio frame does not meet a determining criterion of the current level, an operation of determining whether the to-be-transmitted audio frame meets a determining criterion of a next level.

16. The non-transitory computer-readable storage medium according to claim 13, wherein the criticality level comprises a first level, a second level, a third level, and a fourth level; and a determining criterion of the first level comprises: a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is greater than a target threshold;

a determining criterion of the second level comprises: a VAD value of the to-be-transmitted audio frame is 1, a VAD value of a previous to-be-transmitted audio frame of the to-be-transmitted audio frame is 1, and an energy value of the to-be-transmitted audio frame is greater than a target multiple of an energy value of the previous to-be-transmitted audio frame; or a VAD value of the to-be-transmitted audio frame is 1, a VAD value of a previous to-be-transmitted audio frame of the to-be-transmitted audio frame is 0, and an absolute value of a difference between fundamental frequency values of the to-be-transmitted audio frame and the previous to-be-transmitted audio frame is less than or equal to the target threshold;

a determining criterion of the third level comprises that a VAD value of the to-be-transmitted audio frame is 1; and a determining criterion of the fourth level comprises that a VAD value of the to-be-transmitted audio frame is 0.

17. The non-transitory computer-readable storage medium according to claim 13, wherein the duplicating the at least one to-be-transmitted audio frame according to the quantity of redundant transmissions to obtain at least one redundancy data packet comprises:

encoding the to-be-transmitted audio to obtain an audio bitstream;

duplicating each of at least one to-be-transmitted audio frame in the audio bitstream for a plurality of times, until a quantity of copies reaches a quantity of redundant transmissions of each of the at least one to-be-transmitted audio frame, to obtain a plurality of redundant audio frames; and encapsulating the plurality of redundant audio frames as the at least one redundancy data packet.

* * * * *